(No Model.) 4 Sheets—Sheet 2.
F. C. BELCHER.
MACHINE FOR MAKING PAPER BAGS.
No. 356,441. Patented Jan. 25, 1887.
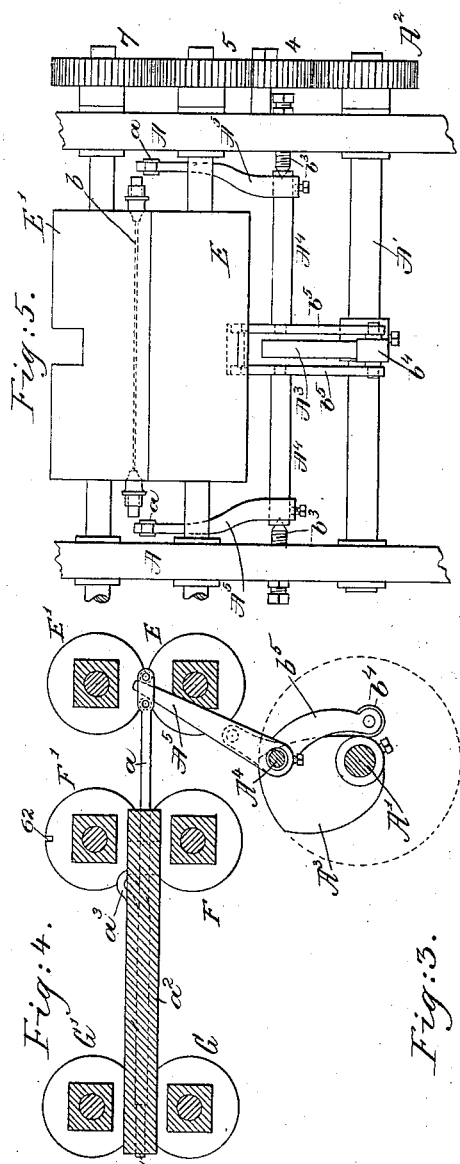
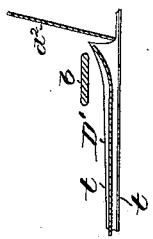
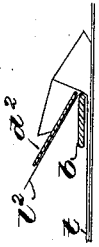
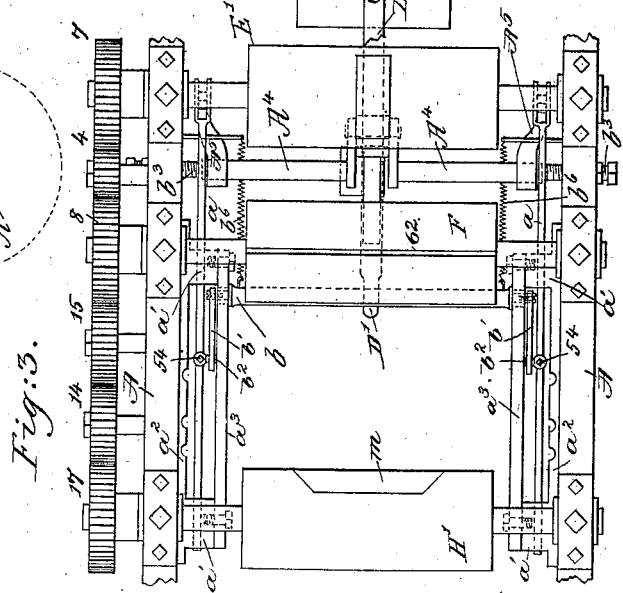
Witnesses:
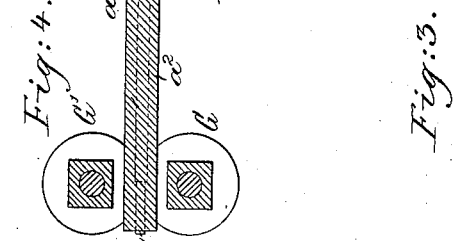
Inventor:
Fred C. Belcher.
by Crosby & Gregory
Attys.

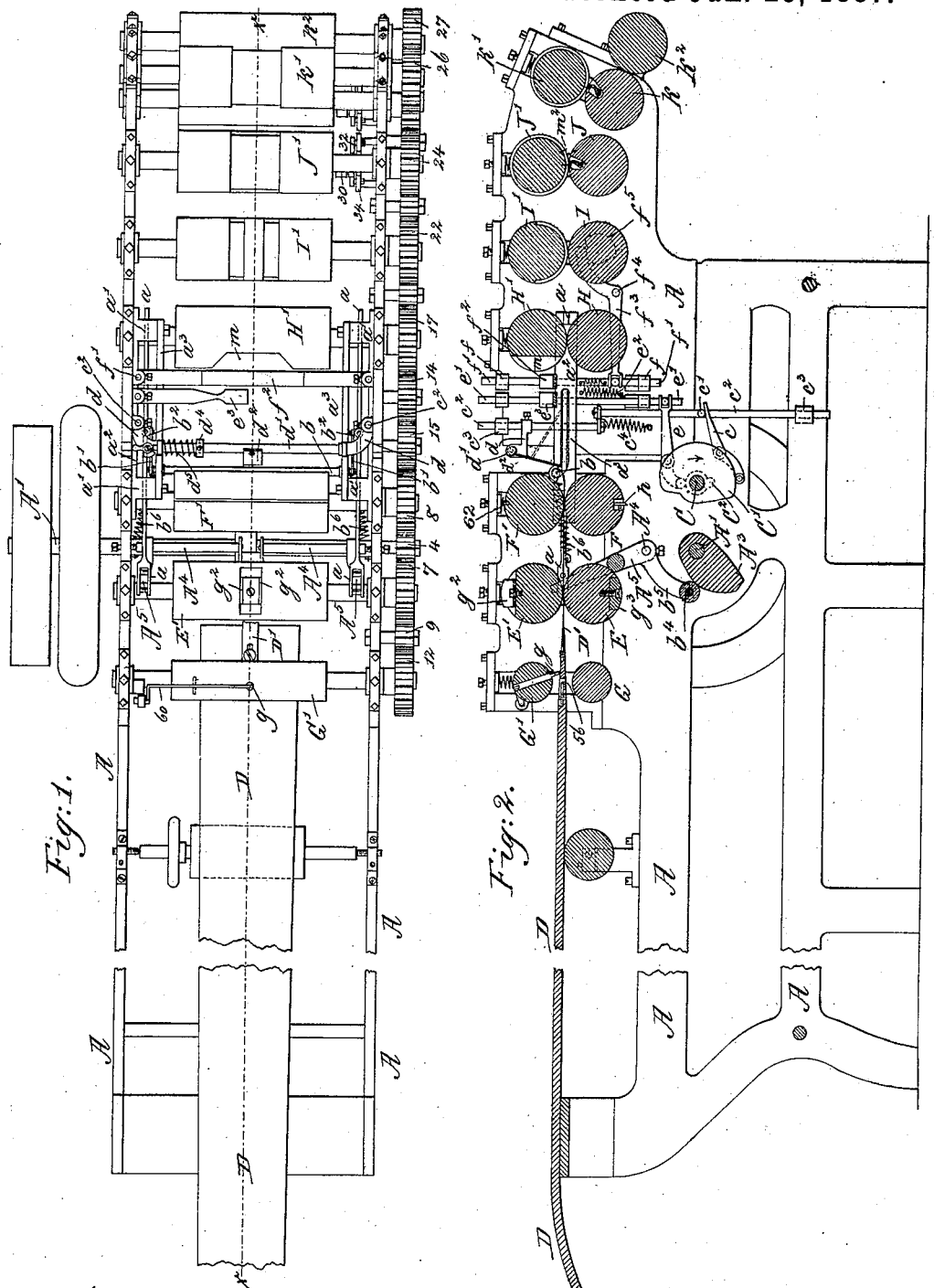

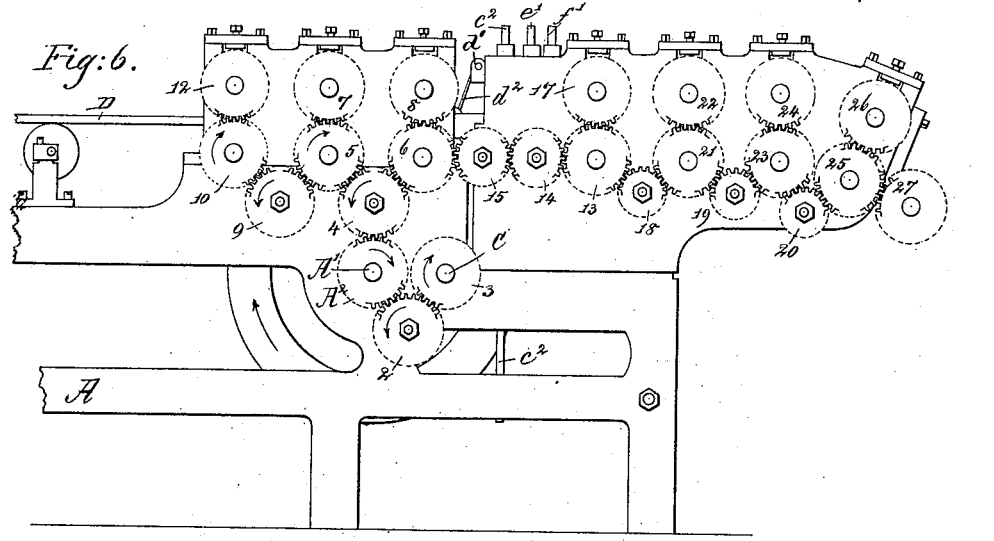

(No Model.) 4 Sheets—Sheet 4.
F. C. BELCHER.
MACHINE FOR MAKING PAPER BAGS.
No. 356,441. Patented Jan. 25, 1887.
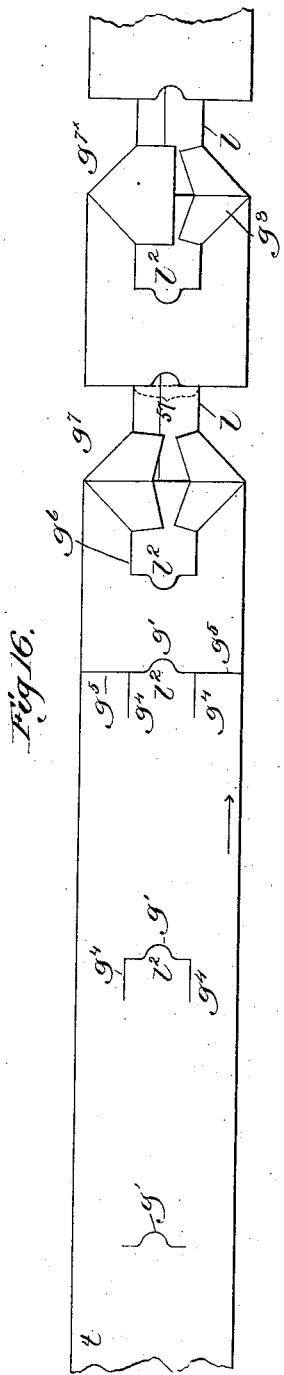
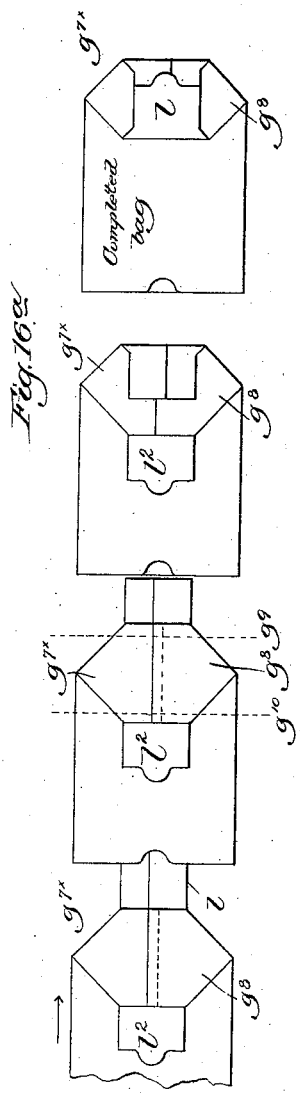

UNITED STATES PATENT OFFICE.

FRED. C. BELCHER, OF CANTON, MASSACHUSETTS.

MACHINE FOR MAKING PAPER BAGS.

SPECIFICATION forming part of Letters Patent No. 356,441, dated January 25, 1887.

Application filed December 7, 1885. Serial No. 184,956. (No model.)

*To all whom it may concern:*

Be it known that I, FRED. C. BELCHER, of Canton, county of Norfolk, and State of Massachusetts, have invented an Improvement in Machines for Making Paper Bags, of which the following description, in connection with the accompanying drawings, is a specification, like letters on the drawings representing like parts.

This invention has for its object to improve and simplify the construction of that class of machines for making paper bags wherein the bag to be made is to have a square bottom; but it will be obvious that some of my improvements are applicable to other machines—as, for instance, those making bags having satchel-bottoms.

One essential feature of my invention is a peculiar oscillating finger to enter the bottom-forming opening of the tube and lay the upper ply of the tube back upon the top of the tube to form a sort of diamond fold, the finger having co-operating with it a folding-bar, which bears upon the tube at the rear of the mouth-forming opening. The finger has a rocking movement as the tube is fed continuously forward in the production of the diamond fold for the bag-bottom, and co-operating with the said finger and folding-bar are a side-closing finger and a presser-bar, which operate in succession to fold one side flap down ahead of the other, as will be hereinafter described, one side flap preferably overlapping the other. The folding-bar has a reciprocating movement.

The paper tube to be made into bags is produced upon a former in usual manner, and before its arrival at the finger referred to the upper ply is cut through transversely to form a lip, and thereafter both plies of the tube are provided with longitudinal slots, and then, by a third pair of rolls, both plies are cut transversely from the longitudinal slots referred to to the edges of the tube, leaving a small central portion of the under ply of the tube connected with a part of the tube held by feed-rolls at a point beyond the fingers and devices which co-operate to fold back the upper ply to produce the bottom of the bag. After the parts of the tube have been folded to form the bottom for a bag, the bottom is pressed between rolls, and is then pasted by a set of pasting-rolls, and then the partially-completed bottom is cross-folded, and as the first cross-fold is made the connecting portion of the lower ply of the tube is cut off.

The particular features in which my invention consists will be hereinafter more fully described, and pointed out in the claims at the end of this specification.

Figure 1 is a plan view of my improved machine, the tube-former being partially broken away to save space on the drawing. Fig. 2 is a longitudinal section of Fig. 1 in the line $x$ $x$. Fig. 3 is an enlarged detail, chiefly to show the folding-bar and the devices to operate it, the fingers co-operating therewith being removed, a portion of the tube-former being shown at the right of the drawing, the opening-spring connected with the tube-former being partially shown, the figure being in a position the reverse of that shown in Fig. 1. Figs. $3^a$ and $3^b$ are details to be referred to. Figs. 4 and 5 are enlarged details showing devices instrumental in reciprocating the folding-bar; Fig. 6, a partial side elevation of the machine to show the operative gearing; Fig. 7, a detail of the roll for finally severing the bag from the tube and for making the first cross-fold; Fig. $7^a$, an end view of Fig. 7, with part of the end of the roll broken out to show the blade $m^2$. Fig. 8 represents the lower roll co-operating with the rolls shown in Fig. 7, the said figure also showing the cam and cam-holder in position to operate the nipper. Fig. $8^a$ is a section of Fig. 8 in the dotted line $x^2$, looking toward the right, a part of the roll being broken out to better show the construction of the parts; Fig. 9, a detail showing the nipper removed from the roll shown in Fig. 8; Fig. 10, an enlarged detail of the bottom-opening finger and the rock-shaft carrying it; Figs. 11 and 12, details of the cam and cam-holder for operating the nipper carried by the roll shown in Figs. 8 and $8^a$; Fig. 13, a detail of one of the bearings for the rock-shaft $d'$ and lever to lock the shaft in place. Fig. 14 is a section of Fig. 10 in the dotted line $x^3$, looking toward the right. Fig. 15 is a top view of the left-hand end of Fig. 10; and Figs. 16 and $16^a$, taken together, show the different steps or operations to which the tube is subjected in the production of a bag.

The frame-work A of the machine, of suitable shape to contain the working parts, has bearings for the main shaft A', which, by a gear, A², thereon, co-operating with other gearing, (shown best in Figs. 1 and 6,) operate the different rolls and movable parts of the machine.

The main shaft A' has a cam, A³, which is instrumental in operating the rock shaft or lever A⁴, the two arms A⁵ of which enter slots (see Figs. 4 and 5) in the ends of two rods, $a$, which slide in boxes or bearings $a'$ of a plate, $a^2$, secured to the inner side of the frame A. The plates $a^2$ support slotted guides or raceways $a^3$, the shape of the slot in each being shown in Fig. 2 and in dotted lines, Fig. 4.

The slots referred to in the guides or raceways $a^3$ receive the ends of the folding-bar $b$, which ends are preferably provided with rolls to obviate friction in the slots. The ends of the bar $b$ have pivoted to them links $b'$, which in turn are pivoted upon collars $b^2$, made adjustable on the slide-rods $a$ by means of suitable set-screws, 54. (Shown best in Fig. 3.)

As the slide-rods are moved horizontally the folding-bar is made to follow in a path coincident with or defined by the said slots, as will be described.

To secure great compactness in the arrangement of the parts, I have provided the rock-shaft A⁴, supported on the pointed screws $b^3$ and quite near the main shaft, with a crank or band at its center, as shown best in Fig. 5, in order that the cam A³, after striking the roll $b^4$, carried by the arms $b^5$ of the said rock-shaft, may pass the line of center of the rock-shaft without touching the latter, the said roll $b^4$ being carried by arms $b^5$, attached to the said rock-shaft. The slide-rods $a$ are returned into their normal position, or so moved as to keep the roll $b^4$ against the cam A³, by suitable springs, $b^6$. The pinion A² on the main shaft engages an intermediate, 2, (see Fig. 6,) which in turn engages the pinion 3 on and rotates the cam-shaft C, said cam-shaft having at or near each end like cams, C', one only of which is shown, (see Fig. 2;) and that one of the said cams nearest the left-hand side of the machine, supposing the operator to be standing at the receiving end of the said machine, has next to it a small cam, C², now and hereinafter called the "presser-finger cam." The cams C' act upon the short ends of levers $c$, one at each side the machine, which in turn act upon pins or projections $c'$ of offset guide-rods $c^2$, held in bearings $c^3$ and kept normally pressed down by one or more springs, $c^4$. These guide-rods $c^2$, above the plates $a^3$, have adjustable bearings $d$ for the rock-shaft $d'$, which carries the bottom opening or forming fingers $d^2$, attached to the said rock-shaft by the screw $d^3$. The rock-shaft $d'$ has an adjustable collar, $d^4$, to which is connected one end of a spring, $d^5$, while the other end of the said spring is attached to a pin, $d^6$, projecting from the bearing $d$, as best shown in Fig. 10.

The spring referred to acts to return the finger $d^2$ to its normal position when the guide-rods are lifted into their highest position. The finger $d^2$ will have a rising-and-falling and a swinging movement.

The small cam C² operates a lever, $e$, and the latter reciprocates in one direction a rod, $e'$, against the stress of a spring, $e^2$, the said rod sliding in guides attached to the frame-work. The rod $e'$ has adjustably secured to it the presser-finger $e^3$, which is extended from the said rod nearly half-way across the machine, and above the paper tube $t$ and at the rear of the finger $d^2$.

At each side of the machine, in guides $f$, are guide-rods $f'$, which, above the level of the tube-former, carry the presser-bar $f^2$. These rods $f'$ and presser-bar are raised by suitable springs, (shown in Fig. 2,) and are moved down by levers $f^3$, pivoted at $f^4$ and acted upon by cams $f^5$, one of which is shown by dotted lines in Fig. 2.

The bags to be made are cut from a paper tube, $t$, made by folding a web of paper about a tube-former, D, of usual construction, it having at one end a spring-tongue, D', the forward end of which is turned upward to lift, as will be described, a part of the upper ply of paper comprising the tube at the point where it is cut through in the formation of the lips.

The gear A² engages an intermediate gear, 4, which, in engagement with the gears 5 and 6 on the shafts of the rolls E F, serves to rotate them, and the said gears 5 6, through gears 7 8 on the shafts of the rolls E' F', rotate the latter in unison with the rolls E F. An intermediate, 9, driven by the gear 5, engages a gear, 10, on the shaft of the roll G. The gear 10 engages a gear, 12, on the shaft of and rotates the roll G'. The tube-former D is extended forward between the rolls G G', and the spring-tongue D' is extended forward to a point in front of the rolls, when its end is turned upward, as described, at a point beyond the folding-bar $b$.

The tube-former between the rolls G G' is provided with a small slot, 56, (see Fig. 2,) and the roll G' is provided with a lip-cutter, $g$, of usual construction, actuated by lever 60 and co-operating with the said slot, the said lip-cutter meeting the upper ply of the paper tube surrounding the tube-former just above the said slot, and cutting in the same a slot, $g'$, of substantially the shape shown in Fig. 16, to form in the upper ply of the tube an opening lip.

The roll E' has upon it two cutting-blades, $g^2$, which, in the rotation of the rolls E E', co-operate with a cutting block or bed, $g^3$, on the roll E, and cut through both plies of the tube at opposite sides of the narrow tongue D', making two slits, $g^4$, (see Fig. 16,) which intersect the slot $g'$. In the further forward movement of the paper tube, as the latter passes between the rolls F F', the blade $h$, carried by the roll F, co-operating with the roll F', or a longitudinal slot, 62, therein, acts to sever both plies of the tube from the slots $g^4$ to the edges of the tube, as at $g^5$. The cuts made by the blades so far described complete the severance of the tube, except a narrow portion, 57, Fig. 16, of the under ply thereof, near its center, and of a width equal to the strip mark $l$ $l$ Fig. 16. The tube, cut as described, passes from between the rolls F F' under the folding-bar $b$, which latter is then in its most elevated position, as in Figs. 2 and 3ª, close to the roll F'.

The forward end of the tongue D' projects toward the delivery end of the machine to a point just beyond the right-hand side of the folding-bar $b$, (see Fig. 3ª,) where the said end is turned upward to act upon and lift the lip $l^2$ in the upper ply of the tube, so that the lower end of the bottom-opening finger $d^2$ will readily pass below the said lip as the tube is moved forward by the feed-rolls E E' acting thereon, the finger $d^2$ acting to detain the lip part $l^2$ and part of the upper ply of the tube, and at the same time the folding-bar $b$ is moved quickly downward and toward the delivery end of the machine by the action of the cam A³, as before described, and the folding-bar is then moved forward with the tube, the result being that the upper ply of the tube is laid back, as it were, upon the lower ply, as shown in Fig. 3ᵇ, and as in Fig. 16 at $g^6$.

During the forward movement of the folding-bar the finger $d^2$, by the pressure of the paper against it, is swung forward, and the slide-rods $c^2$ are somewhat elevated, and as the folding-bar $b$ completes its forward movement, as in Fig. 3ᵇ, the slide-rods $c^2$, and with them the rock-shaft $d'$ and finger $d^2$, are raised, permitting the spring $d^3$ to act upon the rock-shaft $d'$, and throw the finger $d^2$ again forward into its normal position.

Just before the finger $d^2$ is raised, as described, and just before or as the bar $b$ is started backward by its operating-spring $b^6$, the cam C² operates to throw the presser-finger $e^3$ down upon one half of the bottom portion of the bag, as herein shown, the half marked $g^7$ closing the said half down quickly, as at $g^{7\times}$, and thereafter the cams $f^5$, acting on the levers $f^3$, throw down the presser $f^2$, which extends entirely across the portion of the paper tube folded into the shape described, and acts to lay the other half, $g^8$, of the bottom down upon and preferably to somewhat overlap the half $g^{7\times}$ thereof. The tube, having its upper ply folded into the form described, passes between the rollers H H' I I' J J' K K' and then between K and K². The shaft of the roller H has upon it a gear, 13, which is driven through two intermediates, 14 and 15, actuated by the gear 6. The gear 13 engages a gear, 17, on the shaft of and rotates the roll H', and the intermediates 18, 19, and 20 and the co-operating gears 21, 22, 23, 24, 25, 26, and 27 actuate the balance of the rollers just referred to.

The rolls H H' are pressing-rolls, having for their chief object to press and flatten the diamond-shaped edges of the bottom, the upper roll, H', being cut away centrally, as at $m$, to avoid twisting out of shape the central portion of the bottom of the bag.

The rolls I I' are employed for pasting the bottom of the bag, the roll I' having a pasting-pad of usual construction. In practice the said pad will be provided with paste in usual manner, usually by a trough or paste-roll working in a paste-box located above the roll I'.

The rolls J J' serve a double purpose—i. e., they first cut off the narrow central portion, $l$, of the lower ply which was not cut off by the rolls F F', and then, by means of a blade, $m'$, in the roll J', they form the first cross-fold of the bag-bottom on the line $g^9$, Fig. 16ª.

Referring to Figs. 1, 7, and 7ª, the cutting-off blade is marked $m^2$, it entering a slot, $m^3$, (see Fig. 8,) in the under roll, J. The under roll, J, has in it a nipper, $m^4$. (Shown separately in Fig. 9 and in position in Figs. 8, 8ª, and 2.) This nipper is made as a jaw, concaved at one side and co-operating with an edge, $m^5$, (see Fig. 8ª,) carried by the roll J, the blade $m'$ tucking the paper down between the nipper and the said edge. The nipper has two journal-like extensions, 28, which are surrounded by springs 29, (see Fig. 8,) which are connected each at its opposite end to a part of the roll and to the nipper. The springs 29 act normally to keep the nipper $m^4$ closed against the edge $m^5$. One of the extensions 28 has fast upon it a crank-arm, 30, provided with a roll or stud, 31, which, in the rotation of the roll J, acts upon a cam, 32, connected by bolts 33 to a cam-holder, 34, the said cam being preferably made in two parts, as 32 and 32×, (see Figs. 11 and 12,) both of which are made adjustable with relation to each other, to cause the nipper to be opened at the proper time to permit the blade $m'$ to push the paper between the nipper and the edge $m^5$, and to grasp and crease the paper, and then to release it, in order that the bag-blank may be passed forward between the rolls K K', between which the bag-bottom receives the second cross-fold in the line $g^{10}$, Fig. 16ª. The cam-holder is supported on arms 62, attached to the frame-work A.

The roll K in practice has a blade like the one $m'$ attached to the roll J', and the roll K has in practice a nipper like the one described as carried by the roll J, the said nipper in practice being opened and closed in like manner as the nipper carried by the roll J.

The rollers J J' and their co-operating mechanism for forming the second and final folds of the bag are otherwise of substantially the same construction and mode of operation as corresponding mechanism in the patents of W. C. Cross, No. 336,474, February 16, 1886, No. 325,059, August 25, 1885, and No. 243,858, July 5, 1881, to which reference is made for details.

The bag having been finished, it is delivered from the machine between the rolls K and K².

The rock-shaft $d'$, to which is attached the finger $d^2$, is cut away at one end, as at the left of Fig. 10, to form a flat bearing-face, 58, against which may act the short end of a lever, 38, pivoted at 39 on the bearing d, whenever it is desired (as when introducing the paper tube into the machine in working position) to hold the finger $d^2$ out of operative position.

The rock-shaft $d'$, returned to its normal position, as described, by the spring $d^5$, has fast upon it a stop-collar, $39^\times$, having a toe, 40, which, when the finger arrives in its normal position, strikes against a surface, 42, of a block, 43, the said toe and block forming a positive stop.

I do not broadly claim a finger to enter the slit in a paper tube and aid in forming the mouth of the bag.

The rollers employed to paste the bag and form the cross-folds are like those now employed in machines for making satchel-bottom bags.

The finger $d^2$ is shown in Fig. 2 by dotted lines, as in the full-line diagram, Fig. $3^b$.

I claim—

1. In a paper-bag machine, the rolls F F' and the spring-tongue D', combined with the finger $d^2$, the rock-shaft to which it is attached, the bearings for the rock-shaft, and means, substantially as described, to raise or lower the said rock-shaft.

2. In a paper-bag machine, the rolls G G', E E', and F F', their cutting devices to cut the tube, as at $g'$ $g^4$ $g^5$, and the spring-tongue to enter the tube and lift its lip portion $l^2$, combined with the rods $c^2$, means, substantially as described, to move them, the bearings, the rock-shaft $d'$, its attached finger $d^2$, and the spring to move the rock-shaft, to operate substantially as described.

3. In a paper-bag machine, rolls to feed the tube, the spring-tongue to separate the two plies of the tube, the rock-shaft $d'$, its attached finger $d^2$, to enter the bottom-forming opening of the tube, and the spring to move the said rock-shaft, combined with the folding-bar and with the presser-finger, and means, substantially as described, to operate the said folding-bar and the said finger, the latter pressing one of the side flaps of the bag down in advance of the other, substantially as described.

4. In a paper-bag machine, rolls to feed the tube, the spring-tongue to separate the two plies of the tube, the rock-shaft $d'$, its attached finger $d^2$, to enter the bottom-forming opening of the tube, and the spring to move the said rock-shaft, combined with the folding-bar, means, substantially as described, to operate it and the presser-finger and presser-bar, and means, substantially as described, to operate them, whereby the upper ply of the tube is laid back upon itself and the side flaps are folded down one after the other, as set forth.

5. The rotating shaft C, its attached cam C', levers $c$, rods $c^2$, guides $c^3$, bearings $d$, rock-shaft $d'$, its attached finger, and the spring $d^5$, combined with the spring-tongue to open the tube, slotted as described, and with the folding-bar and means, as described, to reciprocate it.

6. The shaft C, cam $C^2$, lever $e$, rod $e'$, and attached presser-finger $e^x$, combined with the rods $f'$, the attached presser-bar $f^2$, and the levers $f^3$ and the cams to move the said levers, substantially as described.

In testimony whereof I have signed my name to this specification in the presence of two subscribing witnesses.

FRED. C. BELCHER.

Witnesses:
G. W. GREGORY,
C. M. CONE.